United States Patent
Sakata et al.

(10) Patent No.: US 7,611,804 B2
(45) Date of Patent: Nov. 3, 2009

(54) NONAQUEOUS SECONDARY BATTERY AND ELECTRONIC EQUIPMENT USING THE SAME

(75) Inventors: Hideo Sakata, Ibaraki (JP); Hayato Higuchi, Ibaraki (JP); Fusaji Kita, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 727 days.

(21) Appl. No.: 11/092,652

(22) Filed: Mar. 30, 2005

(65) Prior Publication Data
US 2005/0221185 A1 Oct. 6, 2005

(30) Foreign Application Priority Data
Mar. 31, 2004 (JP) ............................ P2004-107162
Sep. 10, 2004 (JP) ............................ P2004-263311

(51) Int. Cl.
*H01M 4/58* (2006.01)
(52) U.S. Cl. .................... 429/231.8; 429/322; 429/321; 429/231.7
(58) Field of Classification Search ................. 429/322, 429/321, 231.7, 231.8
See application file for complete search history.

(56) References Cited

U.S. PATENT DOCUMENTS 4,865,931 A * 9/1989 McCullough et al. ........ 429/338

2002/0006552 A1 * 1/2002 Ishida et al. ................. 429/303
2002/0018940 A1 * 2/2002 Nirasawa et al. ............ 429/340

FOREIGN PATENT DOCUMENTS

| JP | 06-295741 | * | 4/1993 |
| JP | 6-267590 A | | 9/1994 |
| JP | 6-295741 A | | 10/1994 |
| JP | 9-27315 A | | 1/1997 |
| JP | 9-129232 A | | 5/1997 |
| JP | 10-050298 | * | 2/1998 |
| JP | 10-50298 A | | 2/1998 |
| JP | 2000-228190 A | | 8/2000 |
| JP | 2003-272625 A | | 9/2003 |

* cited by examiner

*Primary Examiner*—Patrick Ryan
*Assistant Examiner*—Ben Lewis
(74) *Attorney, Agent, or Firm*—Birch, Stewart, Kolasch & Birch, LLP

(57) ABSTRACT

A nonaqueous secondary battery comprising an electrode body which comprises a positive electrode and a negative electrode laminated with a separator interposed between them, and a nonaqueous electrolyte, wherein said negative electrode comprises graphite as a negative electrode active material, and has a coating density of at least 1.70 g/cm$^3$, pore diameter of the maximum of less than 0.5 μm, and the logarithmic value of differential intrusion of at least 0.14 cm$^3$/g at the pore diameter of the maximum.

13 Claims, 2 Drawing Sheets

NONAQUEOUS SECONDARY BATTERY AND ELECTRONIC EQUIPMENT USING THE SAME

This application claims priority to Application Nos. 2004-107162 and 2004-263311 filed in Japan on Mar. 31, 2004 and Sep. 10, 2004 respectively, and which are herein incorporated by reference in their entirety.

BACKGROUND OF THE INVENTION

1. Field of the Invention

The present invention relates to a high-capacity nonaqueous secondary battery comprising a high-density negative electrode with a high capacity and a high rate of utilization, and also to electronic equipment comprising said battery.

2. Prior Art

Nonaqueous secondary batteries represented by lithium ion secondary batteries have been increasingly used, since they have a high capacity, a high voltage, a high energy density and a high output. Also, studies with the aim of increasing the capacity and charging voltage of batteries have been made, and it is expected that the electrical energy discharge will need to be increased in batteries.

In order to increase the capacity of nonaqueous secondary batteries using the same active materials, the following measures are contemplated: (1) increasing the rate of utilization or the capacity of the active material, (2) raising the content of the active material in an electrode, and (3) increasing the density of an electrode. With regard to (1), a graphite negative electrode has a high capacity, which approaches the theoretical value of 372 mAh/g. With regard to (2), the binder content can be decreased to about 2% while the content of the active material is increased to 98%, which are close to the limits.

On the other hand, with regard to (3), the theoretical true density of graphite is 2.1 to 2.2 g/cm$^3$, while the actual electrode density of negative electrodes are about 1.6 g/cm$^3$, and thus it is considered that a more likely path which will end up improving the capacity is in increasing the negative electrode density.

However, when graphite with a higher crystallinity which achieves a higher capacity is used, the rate of utilization and the load characteristic of the electrode decreases, as the electrode density is increased, and thereby a problem occurs in that the increase in the density does not lead to a high energy density.

The causes for the decrease in the rate of utilization of the electrode in accordance with increasing the density of an electrode have been analyzed to solve the above problem. The first cause was thought to be that the increase in the electrode density makes it difficult for an electrolyte to enter-into the electrode. With the increase in the density of a negative electrode, spaces among active material particles gradually decrease. Particularly, when the electrode density becomes 1.70 g/cm$^3$ or higher, the electrolyte hardly enters into the active material so that, in some parts, the surface of the active material are not in contact with the electrolyte, and thus the rate of utilization of the active material decreases in those parts. In order to improve this, it is required that the spaces into which the electrolyte can enter are secured in the active material.

As patent publications disclosing the diameter and volume of micropores (holes) of an electrode, the following patent publications are known:

JP-A-6-267590 discloses a secondary battery which comprises graphitic particles as an active material and defines the porosity of a negative electrode and the ratio of a volume occupied by pores having certain diameters to a total pore volume as well as the solvent and electrolyte of an organic electrolyte to be used.

JP-A-10-050298 defines the density of a negative electrode mixture and the ratio of a volume occupied by pores having certain diameters or more to a total pore volume.

JP-A-9-027315 controls a pore volume, a porosity, an average pore diameter, and the like by mixing carbon materials having different shapes at a specific ratio.

JP-A-9-129232 defines the ratio of a volume occupied by pores of a negative electrode having diameters in a certain range to a total pore volume, and an average pore diameter.

JP-A-06-267590 describes that "when a packing density is high and the sum of the volumes of pores having a diameter of 0.5 µm or more is small, a capacity is low", and JP-A-10-050298 describes that "when an average diameter in a pore distribution is less than 0.5 µm, holes required for diffusing lithium ions cannot be secured among the graphitic particles, so that a capacity maintenance factor during discharging greatly decreases." Therefore, it is expected that pores of less than 0.5 µm in size make it difficult to obtain a discharge.

With regard to a process of producing a negative electrode such that a negative electrode density is 1.2 g/cm$^3$ or more and the sum of volumes of pores in a negative electrode mixture having a pore diameter of 0.5 µm or more occupies 80% or more of the total pore volume of the negative electrode, JP-A-10-050298 describes that a sublimable substance such as naphthalene is contained in the negative electrode mixture so as to be gasified and vaporized with decomposition by heating, and that a solid component soluble in an electrolyte is added to the negative electrode mixture in an amount of 1 to 40% based on graphite so as to dissolve the solid component in the electrolyte.

In the former case, it is thought that the residual sublimable substance in the electrode may cause self-discharge and resulting in the expansion of the battery during storage at high temperatures. In the latter case, when the packing density and porosity of the negative electrode are adjusted by the addition of the solid component soluble in an electrolyte to the negative electrode so as to dissolve the above-mentioned solid component, the wettability of the electrode is increased since an alkali metal salt or an alkaline earth metal salt previously contained in the electrode is eluted from the electrode into the electrolyte during the contact of the electrolyte with the electrode so as to improve the penetrability of the electrolyte and such a salt acts as an electrolyte, and additionally voids formed after the elution function as passages of ions (see JP-A-06-295741).

SUMMARY OF THE INVENTION

One object of the present invention is to provide a high-capacity nonaqueous secondary battery comprising a negative electrode with a high rate of utilization even at a high density.

Another object of the present invention is to extend the operation time of electronic equipment using the above-mentioned high-capacity nonaqueous secondary battery in the electronic equipment.

The present invention achieves the above objects with a battery comprising an electrode body which comprises a positive electrode and a negative electrode which are laminated with a separator interposed between them, and a non-aqueous electrolyte, wherein the negative electrode contains graphite as an active material and has a coating density of at least 1.70 g/cm$^3$, a pore diameter of the maximum of less than 0.5 µm and a logarithm of differential intrusion of at least 0.14 cm³/g at the pore diameter of the maximum.

The use of a negative electrode of the present invention having the above characteristic properties increases the capacity of a nonaqueous secondary battery, and the use of such a battery in electronic equipment extends the operation time of the electronic equipment.

BRIEF DESCRIPTION OF THE DRAWINGS

FIG. 1 is a schematic view showing one example of a nonaqueous secondary battery according to the present invention;

DETAILED DESCRIPTION OF THE INVENTION

One example of the nonaqueous secondary cell according to the present invention will be explained by making reference to the drawings.

Figure 1A:
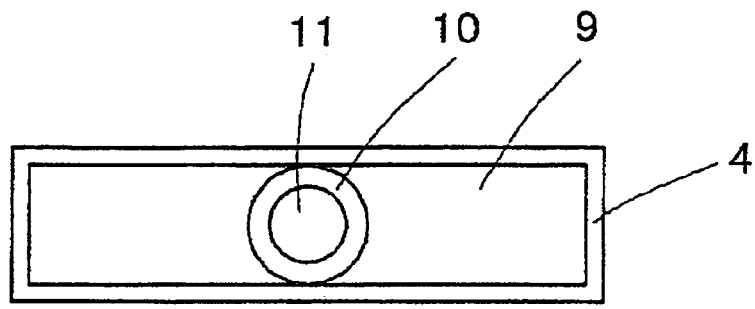
FIG. 1A is a plan view thereof.
Figure 1B:
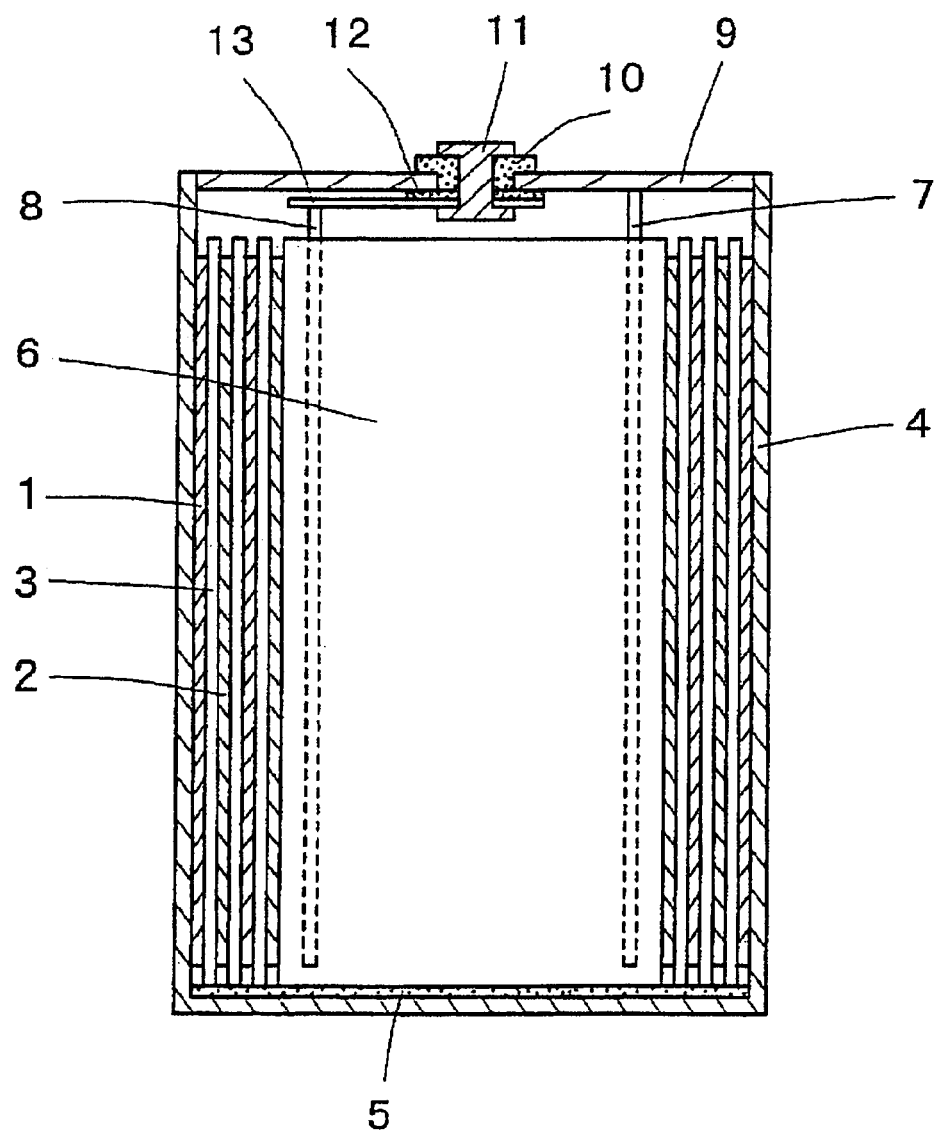
FIG. 1B is a local longitudinal section thereof.
Figure 2:
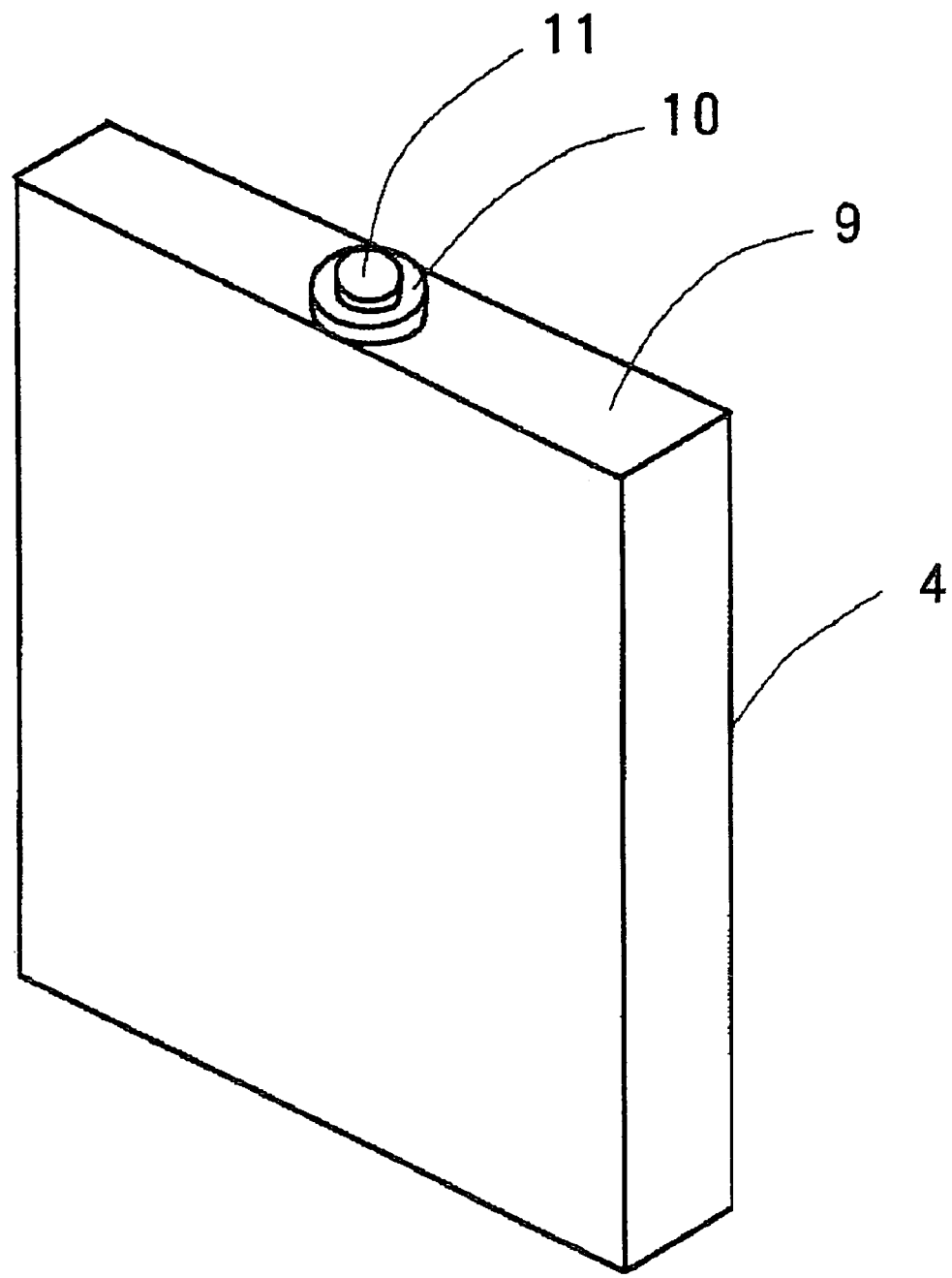
FIG. 2 is a perspective view of the nonaqueous secondary battery shown in FIG. 1.

FIGS. 1A and 1B are a plan view and a partially cross-sectional view respectively, of one example of a nonaqueous secondary cell according to the present invention, and FIG. 2 is a perspective view of this nonaqueous secondary cells.

FIG. 2 shows that the nonaqueous secondary cell of this example is a prismatic cell.

Referring to FIGS. 1A and 1B, the nonaqueous secondary cell of this example comprises positive electrode 1, negative electrode 2 and separator 3. Negative electrode 2 is a negative electrode for a nonaqueous secondary cell explained above. Thereby, the nonaqueous secondary cell has a low internal resistance and good low-temperature characteristics.

Positive electrode 1 and negative electrode 2 are spirally wound with inserting separator 3 between them and pressed to form flat-form wound electrode laminate 6, which is installed in cell case 4 together with an organic electrolytic solution. For simplicity, FIGS. 1A and 1B do not show metal foils used as the collectors of positive electrode 1 and negative electrode 2, and the electrolytic solution. In FIG. 1B, the inner part of electrode laminate 6 is not cross-sectioned. In general, an electrolyte layer comprises a separator and an electrolytic solution impregnated in the separator.

Cell case 4 is usually formed of a metal such as an aluminum alloy, and functions as an exterior member of the cell. Cell case 4 also functions as the terminal of the positive electrode.

At the bottom of cell case 4, insulator 5, which is usually made of a synthetic resin such as polytetrafluoroethylene, is provided.

Lead member 7 for a positive electrode and lead member 8 for a negative electrode are connected with positive electrode 1 and negative electrode 2, respectively, and drawn from flat-form wound electrode laminate 6 consisting of positive electrode 1, negative electrode 2 and separator 3. Metal terminal 11 is attached to metal lid plate 9 which seals the opening of cell case 4 through insulation packing 10. With terminal 11, metal lead plate 13 is attached through insulator 12. Usually, the metal terminal is made of stainless steel, the lid plate is usually made of an aluminum alloy, the insulation packing is made of a synthetic resin such as polypropylene, and the lead plate is made of stainless steel. Furthermore, lid plate 9 is inserted in the opening of cell case 4, and the mated parts of the lid plate and cell case are welded to close the opening of cell case 4 so that the interior of the cell is sealed.

In FIG. 1, lead member 7 for a positive electrode is welded directly with lid plate 9 so that cell case 4 and lid plate 9 together function as the terminal of the positive electrode, while lead member 8 for negative electrode is welded to lead plate 13 and lead member 8 and terminal 11 are electrically connected with lead plate 13 so that terminal 11 functions as the terminal of the negative electrode. However, depending of the material of cell case 4, the terminals may function reversely.

We now turn to the properties and composition of the electrodes.

Despite maintaining a pore diameter of the maximum of less than 0.5 µm and increasing the density of a carbon negative electrode to 1.70 g/cm³ or higher to increase the capacity, it is desired to not decrease the rate of utilization of the electrode also.

The present inventors have surprisingly found that an important property of the electrolyte for negative electrodes is wettability (attraction for the surface). The type of alkali metal salt or alkaline earth metal salt can effect the wettability.

Also, the present inventors have found that the type of alkali metal salt or an alkaline earth metal salt (soluble in the solvent of an electrolyte) that is present among active material particles of a negative electrode, can have the effect of penetrating more quickly into the pores, even into a pores having a small diameter. Desirably, the spaces in the active material can be controlled by the amount of the metal salt. More desirably, such a metal salt is dissolved in an electrolyte and then voids formed after the elution of the salt function as passageways for ions, which allow the electrolyte to penetrate more quickly. A high solubility of a metal salt in the solvent of an electrolyte facilitates the dissolution thereof so as to allow the electrolyte to easily penetrate and form effective voids easily in a short period of time. The solubility of the salt is preferably at least 0.5 mol/L, more preferably at least 1 mol/L.

As the soluble metal salt for use in the electrolyte for the negative electrode having these advantages, a bulky organic lithium salt such as $(C_2F_5SO_2)_2NLi$ is more preferable than a salt such as $LiPF_6$. When a fluorinated alkyl group is present, the wettability of the electrode with an electrolyte is increased and the moisture absorption with the electrode becomes low. Examples of bulky organic lithium salts for use in the present invention include $LiCF_3CO_2$, $Li_2C_2F_4(SO_3)_2$, $LiN(RfSO_2)(Rf'SO_2)$, $LiN(RfOSO_2)(Rf'OSO_2)$, $LiC(RfSO_2)_3$, $LiC_nF_{2n+1}SO_3$ ($n \geq 1$), $LiN(RfSO_2)_2$ wherein Rf and Rf' are each a fluoroalkyl group having 1 to 18 carbon atoms, and polymer imide lithium salt. They may be used singly or as a mixture thereof.

The electrode contains some pores on the surface and some pores on the inside of the electrode. When the pores are small at the surface of the electrode, the passage of an electrolyte through the surface pores controls the diffusion rate. In particular, a high density of the electrode increases this tendency. The present inventors have found that electrically inert particles can be used as a spacer between active material particles, and thereby even in the case of increasing an electrode density to 1.70 g/cm³ or higher, the pore diameter is hardly decreased to a certain diameter or less so that the pores have a certain average diameter. These electrically inert particles include a metal oxide having an insulating property or a metal salt hardly soluble in the solvent of an electrolyte ("HSMS") or mixtures thereof. Examples of the metal oxide include alumina, zeolite, barium titanate and mixtures thereof. It is preferred to use alumina due to its high hardness. The desirable hardness thereof is at least 5, more preferably at least 7, and most preferably at least 11, in terms of new Mohs hardness.

Preferable examples of the HSMS include phosphates, sulfates, carbonates, carboxylates, metallic acid salts and mixtures thereof. More preferably phosphates or sulfates can be used, and particularly preferably are phosphates. Examples thereof include $Li_3PO_4$, $Li_2SO_4$ and $Li_2CO_3$.

The particle diameter of the metal oxide and the HSMS is preferably at least 0.1 μm, more preferably at least 0.2 μm, even more preferably at least 0.3 nm, and yet even more preferably at least 0.5 μm and preferably 2 μm or less, more preferably 1 μm or less.

Furthermore, in the case where such a metal salt is incorporated into the surface layer of graphite, the properties of the surface layer can be desirably improved. A porous material for the electrode is more preferable since ions can pass therethrough while being impregnated with an electrolyte.

The total content of the soluble metal salt, the metal oxide insulator and the HSMS in the negative electrode mixture layer is preferably 2 wt % or less, more preferably 1 wt % or less, and preferably at least 0.2 wt %, more preferably at least 0.4 wt % and most preferably at least 0.6 wt %, based on the weight of the active material in the negative electrode.

Graphite to be used in the negative electrode of the present invention may be any graphite that can be doped or dedoped with lithium ions, and examples of graphite include carbonaceous materials such as natural graphite, pyrolytic carbons, cokes, glassy carbons, calcined products of organic polymer compounds, mesocarbon microbeads, carbon fiber and activated carbon. In particular, natural graphite or graphite modified from natural graphite as a raw material is desirable. They can easily increase the electrode density, and the active material particles easily agglomerate. A spacing $d_{002}$ of (002) planes in X-ray analysis of graphite is 3.3 to 3.4 Å, which is preferably at least 3.34 Å, more preferably at least 3.35 Å and most preferably at least 3.355 Å, and preferably 3.38 Å or less, more preferably 3.37 Å or less and most preferably 3.36 Å or less. The higher crystallinity easily increases the electrode density, but when the crystallinity is too high, it may deteriorate the discharge properties and load characteristics in the case of a high-density electrode.

The specific surface area of graphite is preferably at least 0.5 m$^2$/g, more preferably at least 1 m$^2$/g and most preferably at least 2 m$^2$/g, and preferably 6 m$^2$/g or less, more preferably 5 m$^2$/g or less. The cell performance tends to decrease unless the specific surface area is large to some extent, but a graphite with too large specific surface area tends to easily react with an electrolyte.

Graphite contained in the negative electrode according to the present invention is preferably graphite modified from natural graphite as a raw material, more preferably a mixture of two kinds or more thereof. Natural graphite is low in price and has a high capacity, and thus improves the cost performance of the electrode. In general, natural graphite is easily made higher in density, but the load characteristic is easily decreased. Therefore, it is desirable to suppress the decrease in the load characteristic by mixing graphite, and decreasing the surface crystallinity by surface treatment. The surface crystallinity can be determined by Raman analysis. When a value W (W=A1/A2) of the ratio of a peak area (A1) around 1355 cm$^{-1}$ to a peak area (A2) around 1578 cm$^{-1}$ in Raman spectrum is 0.3 or larger, it is concluded that the surface crystallinity is decreased as compared with natural graphite. Accordingly, the W value is preferably 0.3 or larger, more preferably 0.6 or larger and most preferably 1 or larger. The content of graphite of which the surface crystallinity is decreased is, based on the total weight of graphite, preferably at least 10% by weight, more preferably at least 20% by weight and most preferably at least 30% by weight. Furthermore, it is preferably 90% by weight or less for increasing the electrode density.

Preferably, the use of graphite in which primary particles are agglomerated to form secondary particles achieves a higher capacity even at a high density. The average particle diameter of the primary particles is preferably at least 0.5 μm, more preferably at least 1 μm, and preferably 10 μm or less, more preferably 5 μm or less, when observed with a scanning electron microscope (SEM). The average particle diameter of the secondary particles is preferably at least 10 μm, more preferably at least 12 μm and most preferably at least 18 μm, and preferably 30 μm or less, more preferably 25 μm or less and most preferably 20 μm or less. The content of graphite in which primary particles are agglomerated to form secondary particles is preferably at least 10% by weight, more preferably at least 20% by weight and most preferably at least 30% by weight, based on the total weight of graphite. In particular, it is preferably 90% by weight or less for increasing the electrode density. Further, graphite can be partially replaced with a metal or a metal oxide which can be alloyed with lithium.

A binder to be used for producing a negative electrode is not particularly limited. Since a smaller amount thereof increases the content of the active material in the negative electrode so that the capacity is increased, the binder is preferably a mixture of an aqueous resin which can be dissolved or dispersed in water and a rubbery polymer. Even the small quantity of the aqueous resin can contribute to the dispersing of graphite, and the rubbery polymer can prevent a coating film from being peeled off from an electrode collector due to the expansion and contraction of the electrode during charge and discharge cycles.

Examples of the aqueous resin include polyvinylpyrrolidone, polyepichlorhydrin, polyvinylpyridine, polyvinyl alcohol, cellulose resins such as carboxymethyl cellulose and hydroxypropyl cellulose, and polyether resins such as polyethylene oxide and polyethylene glycol. Examples of the rubbery polymer include latex, butyl rubber, fluororubber, styrene-butadiene rubber, polybutadiene and ethylene-propylene-diene copolymer (EPDM). A combination of carboxymethyl cellulose and styrene-butadiene rubber is commonly used, and most desirable for dispersing graphite and preventing peeling off of the film.

The coating density of a negative electrode mixture after drying and pressing is preferably at least 1.70 g/cm$^3$, more preferably at least 1.75 g/cm$^3$. An upper limit thereof is 2.1 to 2.2 g/cm$^3$ in view of the theoretical density of graphite, more preferably 2.0 g/cm$^3$ or less and most preferably 1.9 g/cm$^3$ or less, in view of affinity to an electrolyte. The pressing is preferably performed plural times, although it may be performed once.

According to the studies by the present inventors, when the negative electrode has a pore diameter of the maximum of less than 0.5 μm, the rate of utilization of the negative electrode of the prior art greatly decreases in the prior art. However, the negative electrode of the present invention can suppress the decrease of a capacity even when the pore diameter of the maximum is less than 0.5 μm. In the present invention, a high capacity can be maintained when the pore diameter of the maximum is 0.45 μm or less, which is desirable for increasing the capacity by raising the electrode density. Too small diameter, however, tends to decrease the capacity. Therefore, the pore diameter of the maximum is preferably at least 0.2 μm, more preferably at least 0.3 μm.

When the logarithmic value of the differential intrusion is small, ions are not capable of smoothly moving so that the battery properties are easily deteriorated. When the pore diameter of the maximum is less than 0.5 μm, the logarithmic value of the differential intrusion is preferably at least 0.14 cm$^3$/g, more preferably at least 0.16 cm$^3$/g and most preferably at least 0.17 cm$^3$/g, and preferably 0.25 cm$^3$/g or less, more preferably 0.20 cm$^3$/g. Too large of a pore diameter of the maximum excessively increases the void volume and makes it difficult to increase the density of the negative electrode.

A separator used in the present invention preferably has a thickness of at least 5 μm, more preferably at least 10 μm, so that it has a directionality in tensile strength and a favorable insulation property and that the heat shrinkage of the separator is minimized. The thickness of the separator is preferably 20 μm or less for load characteristic and a higher capacity:

The air permeability of the separator is preferably 500 sec/100 ml or less, more preferably 300 sec/100 ml or less and most preferably 120 sec/100 ml or less, and preferably at least 50 sec/100 ml. A lower air permeability improves the load characteristic more but may induce an internal short circuit more easily. The lower heat shrinkage ratio of a separator less induces an internal short circuit during the temperature rise, whereby a separator having as low a heat shrinkage ratio as possible is preferably used. The heat shrinkage ratio of the separator is preferably 10% or less and more preferably 5% or less. The separator is preferably heat-treated previously at a temperature of about 100 to 125° C. to restrain the heat shrinkage.

The strength of a separator is preferably at least 6.8×10$^7$ N/m$^2$, more preferably at least 9.8×10$^7$ N/m$^2$, in terms of tensile strength in a machine direction (MD). Tensile strength in a transverse direction (TD) is preferably lower than that in MD, and a ratio of tensile strength in TD to that in MD (TD tensile strength/MD tensile strength) is preferably 0.95 or less, more preferably 0.9 or less, and preferably at least 0.1. TD signifies a direction perpendicular to a winding-up direction (MD) of film resin in the manufacture of a separator (see, for example, JP-A-2000-172420).

In addition, the piercing strength of a separator is preferably at least 2.0 N, more preferably at least 2.5 N. A higher piercing strength prevents the short circuiting of the battery. Typically, the upper limit of the piercing strength is substantially determined by a material used for producing a separator. The upper limit of the piercing strength is about 10 N in the case of a polyethylene separator.

The nonaqueous electrolyte comprises an organic solvent and a metal containing electrolyte. Examples of an organic solvent contained in a nonaqueous electrolyte used according to the present invention include linear esters and carbonates such as dimethyl carbonate, diethyl carbonate, methyl ethyl carbonate and methyl propionate, linear phosphoric triester such as trimethyl phosphate, and ethers such as 1,2-dimethoxyethane, 1,3-dioxolane, tetrahydrofuran, 2-methyltetrahydrofuran and diethyl ether. In addition thereto, nitrogen-containing solvents such as amines and imides, and sulfur-containing organic solvents such as sulfolane and sulfoxide may be used. Among them, linear carbonates such as dimethyl carbonate, diethyl carbonate and methyl ethyl carbonate are preferably used. The amount of the solvent is preferably less than 90% by volume more preferably 80% by volume or less, and preferably at least 40% by volume, more preferably at least 50% by volume and most preferably at least 60% by volume, in view of load characteristic, based on the total volume of the solvents in the electrolyte.

Esters and carbonates with a high dielectric constant, for example, a dielectric constant of 30 or more, is preferably contained in the solvent of the electrolyte. Examples of such compounds include cyclic compounds such as ethylene carbonate, propylene carbonate, butylene carbonate and γ-butyrolactone, sulfur-containing esters such as ethylene glycol sulfite and mixtures thereof. Among them, cyclic carbonates such as ethylene carbonate are particularly preferable. The above compounds with a high dielectric constant is present in an amount of preferably less than 80% by volume, more preferably 50% by volume or less and most preferably 35% by volume or less, based on the total volume of the solvent(s) in the electrolyte, The amount of the above compounds is preferably at least 1% by volume, more preferably at least 10% by volume and most preferably at least 25% by volume, in view of the load characteristic.

Further, in the lithium secondary battery, the nonaqueous electrolyte may further comprise a vinylene carbonate to achieve stable cycle properties. The amount of the vinylene carbonate is preferably at least 0.5% by volume, more preferably at least 1% by weight and further more preferably at least 2% by weight, based on the weight of the electrolyte. Since too large of an amount of vinylene carbonate tends to deteriorate storage properties, the amount of vinylene carbonate is preferably 4% by weight or less, more preferably 3% by weight or less and particularly preferably 2% by weight or less.

In addition, the nonaqueous electrolyte may further comprise a nonionic aromatic compound. Specific examples of the nonionic aromatic compound include aromatic compounds having one or more alkyl groups bonded to the aromatic ring, such as cyclohexylbenzene, isopropylbenzene, t-butylbenzene, octylbenzene, toluene and xylene, aromatic compounds having one or more halogen atoms bonded to the aromatic ring, such as fluorobenzene, difluorobenzene, trifluorobenzene and chlorobenzene, aromatic compounds having one or more alkoxy groups bonded to the aromatic ring, such as anisole, fluoroanisole, dimethoxybenzene and diethoxybenzene, aromatic carboxylates such as phthalates (e.g. dibutyl phthalate and di-2-ethylhexyl phthalate) and benzoates, carbonates having a phenyl group such as methylphenyl carbonate, butylphenyl carbonate and diphenyl carbonate, phenyl propionate, biphenyl and mixtures thereof. Among them, compounds having one or more alkyl groups bonded to the aromatic ring are preferable. Particularly, cyclohexylbenzene is preferably used.

These aromatic compounds form a film on the active material surface in the positive electrode or the negative electrode in the battery The aromatic compounds may be used singly. Alternatively, they may be used in admixture of two or more of them, whereby a superior effect is attained. In particular, when an aromatic compound having one or more alkyl groups bonded to the aromatic ring and an aromatic compound which is oxidized at a lower electric potential than the former aromatic compound are used in combination, the desirable result is obtained of improved safety.

A process of adding the aromatic compound in the nonaqueous electrolyte is not particularly limited. Generally, the aromatic compound is added to the nonaqueous electrolyte before the battery is assembled.

In the present invention, a more preferable range of the amount of such an aromatic compound is at least 4% by weight view of safety and 10% by weight or less in view of load characteristics. When two or more aromatic compounds are used in admixture, the total amount of the compounds is preferably in the above range. Particularly when the aromatic compound having one or more alkyl groups bonded to the aromatic ring and the compound oxidized at a lower electric potential than the former aromatic compound are used in admixture, the compound having one or more alkyl groups bonded to the aromatic ring is used in an amount of preferably at least 0.5% by weight, more preferably at least 2% by weight, and preferably 8% by weight or less, more preferably 5% by weight or less. Meanwhile, the compound oxidized at a lower electric potential than the aromatic compounds having one or more alkyl groups bonded to the aromatic ring is used in an amount of preferably at least 0.1% by weight, more preferably at least 0.2% by weight, and preferably 1% by weight or less, more preferably 0.5% by weight or less.

In addition, the nonaqueous electrolyte may further be in the form of a gel electrolyte and further comprises a polymer component such as polyethylene oxide and/or polymethyl methacrylate.

Examples of the metal containing electrolyte for use in the nonaqueous electrolyte include $LiClO_4$, $LiPF_6$, $LiBF_4$, $LiAsF_6$, $LiSbF_6$, $LiCF_3CO_2$, $Li_2C_2F_4(SO_3)_2$, $LiN(RfSO_2)(Rf'SO_2)$, $LiN(RfOSO_2)(Rf'OSO_2)$, $LiC(RfSO_2)_3$, $LiC_nF_{2n+1}SO_3$ ($n \geq 1$), $LiN(RfOSO_2)_2$ wherein Rf and Rf' are each a fluoroalkyl group having 1 to 18 carbon atoms, and polymer imide lithium salt. They may be used singly or as a mixture thereof. When such an electrolyte is incorporated in the film on the electrode surface, a favorable ionic conduction can be imparted to the film, and such an effect is exerted particularly in the case of $LiP_6$. The concentration of an electrolyte in an electrolyte is not particularly limited. The concentration is preferably at least 1 mol/l and more preferably at least 1.2 mol/l for improving the safety of the battery, and it is preferably less than 1.7 mol/l and more preferably less than 1.5 mol/l for improving the load characteristic.

A preferred example of an active material of a positive electrode used according to the present invention includes $LiCoO_2$, $LiMn_2O_4$, $LiNiO_2$, a lithium complex oxide of such a lithium oxide in which a part of Co, Mn and Ni is replaced with other element (for example, Mn and Ni in the case of $LiCoO_2$), such as $LiCo_xMn_yNi_zO_2$ ($x+y+z=1$) and mixtures thereof. These lithium oxides exhibit an open-circuit voltage of 4 V or more in relation to a Li electrode during charging. Other element(s) (e.g. Ge, Sn, Bi, Ga, In, Tl, Hf, Zr, Ti, Ta, Nb, V, Mo, W and lanthanum series rare earth elements such as Yb) may be partially contained therein. In particular, Ge, Zr, Ti, Ta, Nb and Yb are preferable, and Ge and Zr are most preferable. The content of the other element is preferably at least 0.001 atomic %, more preferably at least 0.003 atomic %, and preferably 3 atomic % or less, more preferably 1 atomic % or less. It is more desirable that the other substitute element is unevenly distributed on an active material surface in the positive electrode. This is because a small quantity of the other element restrains the active material surface from reacting with the electrolyte and hardly induces the decrease of the capacity of the active material. The substitution with the other element is more desirable when a charging voltage is at least 4.35 V, particularly at least 4.4 V, in relation to an Li electrode. This is because the substitution with the other element prevents cycle deterioration caused by the rise of a charge voltage.

When the specific surface area of the active material in the positive electrode is large, the load characteristic is improved, while safety is deteriorates. In the present invention, an active material having a large specific surface area can also be used safely.

In a preferred embodiment, a lithium salt is present in the positive electrode, since the ionic conduction of the electrode is increased, and thus the uniform reactivity of the electrode is enhanced and the safety is further improved. Examples of a lithium salt include inorganic salts such as $LiBF_4$ and $LiClO_4$, and organic salts such as $C_4F_9SO_3L_1$, $C_8F_{17}SO_3Li$, $(C_2F_5SO_2)_2NLi$, $(CF_3SO_2)(C_4F_9SO_2)NLi$, $(CF_3SO_2)_3CLi$, $C_6H_5SO_3Li$, $C_{17}H_{35}COOLi$ and mixtures thereof. Among them, the organic lithium salts are preferable in view of the thermal stability and safety, and fluorine-containing organic lithium salts are more preferable in consideration of ionic dissociation. In particular, organic lithium salts having two or more carbon atoms are preferably used.

A mixture containing the active material of the positive electrode and optionally a conducting aid and a binder such as polyvinylidene fluoride is coated on a collector member such as a metal foil as a core material and shaped to obtain the positive electrode. A conducting aid of the positive electrode is preferably a carbon material, such as graphite and/or carbon black. The amount of the conductive aid is preferably 3% by weight or less, more preferably 2% by weight or less in view of increasing the capacity of the active material in the positive electrode, and preferably at least 0.5% by weight, more preferably at least 0.8% by weight in view of securing the electrical conductivity.

The nonaqueous secondary battery of the present invention has a longer life than conventional batteries and as such, provides extended use of electronic equipment until the battery must be changed or recharged. The increase of electric current and improved capacity of the battery of the present invention when used in electronic equipment are desirable when compared to conventional batteries having 0.2C discharge.

Electronic equipment with which the nonaqueous secondary battery of the present invention can be used is not particularly limited and can preferably be built into a portable apparatus such as a portable telephone, a notebook personal computer, a personal digital assistant (PDA) and a small-sized medical apparatus, an office automation (OA) apparatus or a medical apparatus with battery backup, and various other electronic equipments.

EXAMPLES

The present invention will be illustrated by the following examples, which do not limit the scope of the invention in any way. In the examples, "%" is "% by weight" unless otherwise indicated.

Graphite used in Examples:

The following three graphite A, B and C were used as active materials of negative electrodes:

Graphite A having a spacing $d_{002}$ of (002) planes of 0.3357 nm, an average particle size of primary particles of 17 μm (measured with SEM), a size of crystals in the c-axis direction of 88.5 nm, and a specific surface area of 3.12 m²/g, the particle surfaces thereof being covered with 3-4% of non-graphite carbon formed by calcining pitch.

Graphite B having a spacing $d_{002}$ of (002) planes of 0.3362 nm and a specific surface area of 4.42 m²/g, consisting of secondary particles with an average particle size of 19 μm, which are composed of agglomerated flat plate-form primary particles with a plate size of 1 to 9 μm according to the observation with SEM.

Graphite C having a spacing $d_{002}$ of (002) planes of 0.335 nm and a specific surface area of 1.6 m²/g, consisting of flat particles with an average particle size of 18 μm according to the observation with SEM. Graphite C is a shape-treated product of natural graphite.

Example 1

Production of Negative Electrode:

A mixture of 30% of Graphite A and 70% of Graphite B was used as an active material of a negative electrode. A negative electrode paint was prepared by mixing 97.8% of the graphite mixture, 0.2% of $(C_2F_5SO_2)_2NLi$, 1% of carboxymethylcellulose (CMC) and 1% of styrene-butadiene rubber (SBR) as binders, and water. The negative electrode paint was coated on the both surfaces of a copper foil having a thickness of 10 μm as a negative electrode collector, dried to remove water and pressed with a roll twice. Here, the coating density of this electrode was 1.75 g/cm$^3$. Thereafter, the electrode sheet was slit and a lead member was welded to the slit electrode to obtain a strip-form negative electrode. The W value (A1/A2), which is the ratio of a peak area (A1) around 1355 cm$^{-1}$ to a peak area (A2) around 1578 cm$^{-1}$ in Raman spectrum, was 1.3.

Preparation of Electrolyte:

A nonaqueous electrolyte was prepared by mixing ethylene carbonate (EC) and methyl ethyl carbonate (MEC) in a weight ratio of 1:2, dissolving LiPF$_6$ in this mixed solvent at a concentration of 1.0 mol/l, and then adding 4% of cyclohexylbenzene, 0.2% of biphenyl and 2% of vinylene carbonate to the solution.

Production of Positive Electrode:

$LiCo_{0.995}Ge_{0.005}O_2$ having a specific surface area of 0.5 m$^2$/g, carbon as a conductive aid and $(C_2F_5SO_2)_2NLi$ as a lithium salt were mixed in a weight ratio of 97.9:2:0.1. Then, this mixture (7 kg) was mixed with 2.5 kg of a 6% solution of polyvinylidene fluoride in N-methylpyrrolidone to form a slurry of a positive electrode mixture. The positive electrode mixture slurry was filtrated to remove large particles, and the filtrated slurry was uniformly coated on the both surfaces of an aluminum foil having a thickness of 0.15 μm as a positive electrode collector and dried, followed by press molding with a roll press. The pressed electrode sheet was slit and a lead member was welded to the slit electrode to obtain a strip-form positive electrode. A part of the positive electrode, which did not face to the negative electrode, had no layer of the positive electrode mixture.

Then, the strip-form positive and negative electrodes were laminated with interposing a separator, which was a micro porous polyethylene film having a thickness of 19 μm ("4818" (trade name) manufactured by Asahi Chemical Co., Ltd.) (gas permeability: 80 second/100 ml, piercing strength 3.5 N (360 g); porosity 53%; tensile strength in MD: 2.1×10$^8$ N/m$^2$; tensile strength in TD: 0.28×10$^8$ N/m$^2$), and then the laminate was wound to obtain a laminate electrode body. Thereafter, the electrode body was inserted in a square-shaped battery can made of an aluminum alloy, and the lead members were welded, and a lid for closing the opening of the can was welded with a laser beam.

The battery can was evacuated and then the electrolyte was charged in the can from electrolyte injection hole, followed by purging with carbon dioxide. Thereafter, the battery was precharged and degassed. After evacuating the battery, the electrolyte was supplemented, followed by purging with carbon dioxide. Then, electrolyte injection hole was sealed to obtain a prismatic nonaqueous secondary battery.

The length of the battery is 34 mm in width, 4 mm in the thickness, and 50 mm in height.

In the negative electrode according to the present invention, the pores in the negative electrode were reduced. Carbon dioxide was used in the charging step of the electrolyte to aid in the impregnation of the electrolyte into the negative electrode. The carbon dioxide, which penetrated into the pores of the negative electrode, was dissolved in the electrolyte, and the electrolyte penetrated uniformly into the pores in a short time.

Example 2

A nonaqueous secondary battery of this Example was prepared in the same manner as in Example 1 except that the mixture of 50% of Graphite A and 50% of Graphite B was used as an active material of a negative electrode. However, since the density of the negative electrode was slightly smaller than that in Example 1, it was difficult to insert the electrode body in the battery can. Therefore, the coating amount of the negative electrode mixture was reduced by 3% in comparison with the amount of the negative electrode mixture coated in Example 1, so that the volume of the electrode body was the same as the volume of the electrode body produced in Example 1. The coating density of the negative electrode was 1.72 g/cm$^3$. The W value (A1/A2) was 1.3.

Example 3

A nonaqueous secondary battery of this Example was prepared in the same manner as in Example 1 except that $C_4F_9SO_3Li$ was used in place of $(C_2F_5SO_2)_2NLi$ as an organic lithium salt. The coating density of the negative electrode was 1.75 g/cm$^3$.

Example 4

Production of Negative Electrode:

A mixture of 30% of Graphite A and 70% of Graphite B was used as an active material of a negative electrode. A negative electrode paint was prepared by mixing the above mixture, CMC and SBR as binders, $(C_2F_5SO_2)_2NLi$, alumina (average particle size: 1 μm, new Mohs hardness: 12) and $Li_3PO_4$ (average particle size: 1 μm) in a weight ratio of 97.4:1.0:1.0:0.2:0.2:0.2 with water. The negative electrode paint was coated on the both surfaces of a copper foil having a thickness of 10 μm as a negative electrode collector, dried to remove water and pressed with a roll twice. Here, the coating density of this electrode was 1.75 g/cm$^3$ and the W value (A1/A2) was 1.3.

A nonaqueous secondary battery of this Example was prepared in the same manner as in Example 1.

Example 5

A nonaqueous secondary battery of this Example was produced in the same manner as in Example 4 except that no alumina was added in the preparation process of the negative electrode paint and the negative electrode paint was coated on the copper foil so that the total amount of the active materials per unit area was the same as that in Example 4.

Example 6

A nonaqueous secondary battery of this Example was produced in the same manner as in Example 4 except that, in the production of a negative electrode, neither $Li_3PO_4$ nor $(C_2F_5SO_2)_2NLi$ were used and the negative electrode paint was coated so that the total amount of the active materials per unit area was the same as that in Example 4.

Example 7

A nonaqueous secondary battery of this Example was produced in the same manner as in Example 4 except that only Graphite C (100%) was used in place of the mixture of Graphite A and Graphite B. The coating density of this electrode was 1.76 g/cm³. Thereafter, the electrode sheet was slit and a lead member was welded to the slit electrode to obtain a strip-form negative electrode. The W value (A1/A2 was 0.1.

Example 8

A nonaqueous secondary battery of this Example was produced in the same manner as in Example 4 except that $C_4F_9SO_3Li$ was used in place of $(C_2F_5SO_2)_2NLi$ as an organic lithium salt. The coating density of the negative electrode was 1.75 g/cm³.

Example 9

A nonaqueous secondary battery of this Example was produced in the same manner as in Example 4 except that no $(C_2F_5SO_2)_2NLi$ was used and the negative electrode paint was coated so that the total amount of the active materials per unit area was the same as that in Example 4.

Comparative Example 1

A nonaqueous secondary battery of this Comparative Example was produced in the same manner as in Example 1 except that a coating density of the negative electrode was 1.60 g/cm³. However, the wound electrode body could not be inserted in the battery can since the density of the negative electrode was low. Thus, a certain length of the electrode laminate was cut off so that the wound electrode body could be inserted in the battery can.

Comparative Example 2

A nonaqueous secondary battery of this Comparative Example was produced in the same manner as in Example 2 except that a coating density of the negative electrode was 1.60 g/cm³. However, the wound electrode body could not be inserted in the battery can since the density of the negative electrode was low. Thus, a certain length of the electrode laminate was cut off so that the wound electrode body could be inserted in the battery can.

Comparative Example 3

A nonaqueous secondary battery of this Example was produced in the same manner as in Example 1 except that no $(C_2F_5SO_2)_2NLi$ was used. The coating density of the negative electrode was 1.75 g/cm³.

Each battery produced in Examples 1-9 and Comparative Examples 1-3 was charged at a constant current of 0.16 A (0.2 C) at room temperature until a battery voltage reached 4.3 V, and further charged at a constant voltage of 4.3 V. After 7 hours from the start of charging, the charging was terminated. The voltage of the positive electrode at the termination of charging was 4.4 V in relation to a Li electrode. Subsequently, the battery was discharged at a current of 0.16 A (0.2 C) down to 3 V, and a discharge capacity was measured.

After each battery was discharged at 0.2 C down to 3V, it was disassembled, and the negative electrode was removed, washed with diethyl carbonate (DEC) and dried. With the negative electrode, the pore distribution was determined in the range from 0.02 to 8 μm based on known methods using an automatic Hg porosimeter (Autopore 9310 manufactured by Micromelitics®). The measurements were taken over an intrusion pressure range of 0.5 to 30000 psia at room temperature utilizing an advancing contact angle of 140 degrees, a surface tension of 0.48 N/m. The above intrusion pressure range corresponds to the intrusion pressure of Hg at micro pore size of about 400 to 0.007 μm.

The measurement of the pore distribution after disassembling of the battery means that the measurement is carried out after the formation of voids and thus the state of pores through which ions passes is observed when the battery is formed.

The logarithmic value of differential intrusion is the slope of the curve formed by graphing the logarithmic value of diameter versus the cumulative (Σ) intrusion. The pore diameter of the maximum logarithmic value of differential intrusion is the pore diameter which shows maximum logarithmic value of differential intrusion.

The pore diameter of the maximum means a pore diameter corresponding to the peak of the differential intrusion curve.

The results for the batteries of Examples 1-9 and Comparative Examples 1-3 are summarized in Table 1.

TABLE 1

| Example No. | Discharge capacity[1] | Negative electrode density (g/cm³) | Pore diameter of the maximum (μm) | Logarithmic value of differential intrusion at pore diameter of the maximum (cm³/g) |
|---|---|---|---|---|
| 1 | 108 | 1.75 | 0.45 | 0.17 |
| 2 | 105 | 1.72 | 0.47 | 0.20 |
| 3 | 107 | 1.75 | 0.44 | 0.15 |
| 4 | 115 | 1.75 | 0.47 | 0.21 |
| 5 | 111 | 1.75 | 0.45 | 0.18 |
| 6 | 105 | 1.75 | 0.43 | 0.14 |
| 7 | 106 | 1.76 | 0.40 | 0.15 |
| 8 | 113 | 1.75 | 0.47 | 0.18 |
| 9 | 104 | 1.75 | 0.44 | 0.14 |
| Comp. 1 | 100 | 1.60 | 0.85 | 0.21 |
| Comp. 2 | 99 | 1.60 | 0.90 | 0.22 |
| Comp. 3 | 70 | 1.75 | 0.30 | 0.10 |

Note:
[1] A discharge capacity was reported with that of Comparative Example 1 being 100.

Next, each of the batteries of Examples 1 and 4 and Comparative Example 3, which had the same negative electrode capacity (1.75 g/cm³), was installed in a portable phone (C 3001 manufactured by Hitachi Ltd.), and a continuous calling (conversation) time was measured. In this test, the discharge termination voltage was 3.3 V.

With the batteries of Examples 1 and 4, the continuous calling time was 220 minutes and 235 minutes respectively, while with the battery of Comparative Example 3, it was 150 minutes.

What is claimed is:

1. A nonaqueous secondary battery comprising an electrode body which comprises a positive electrode, a negative electrode, a separator laminated between the positive and negative electrodes, and a nonaqueous electrolyte,
wherein said negative electrode contains graphite as a negative electrode active material, has a dried and pressed coating density of at least 1.70 g/cm³, a pore diameter of the maximum of less than 0.5 μm, and a logarithmic value of differential intrusion of at least 0.14 cm³/g at the pore diameter of the maximum.

2. The nonaqueous secondary battery according to the claim 1, wherein the active material of the negative electrode comprises a solvent and at least one metal salt comprising carbon which is soluble in the solvent.

3. The nonaqueous secondary battery according to the claim 2, wherein the metal salt comprising carbon has a solubility of at least 0.5 mol/L in the solvent.

4. The nonaqueous secondary battery according to The claim 2, wherein The metal salt comprising carbon is an organolithium salt.

5. The nonaqueous secondary battery according to the claim 4, wherein the organolithium salt is at least one selected from the group consisting of $LiCF_3CO_2$, $Li_2C_2F_4(SO_3)_2$, $LiN(RfSO_2)(Rf'SO_2)$, $LiN(RfOSO_2)(Rf'OSO_2)$, $LiC(RfO_2)_3$, $LiC_nF_{2n+1}SO_3$ ($n\geq 1$), $LiN(RfOSO_2)_2$, and polymer imide lithium salt, wherein Rf and Rf' are each a fluoroalkyl group having 1 to 18 carbon atoms, and wherein $n\geq 1$.

6. The nonaqueous secondary battery according to the claim 2, wherein the solvent comprises an ester, carbonate or mixtures thereof.

7. The nonaqueous secondary battery according to the claim 1, wherein the active material of the negative electrode comprises electrically inert particles having an average particle diameter of 2 μm or less.

8. The nonaqueous secondary battery according to the claim 7, wherein the electrically inert particles are a metal salt, a metal oxide or mixtures thereof.

9. The nonaqueous secondary battery according to the claim 7, wherein the nonaqueous electrolyte in active material of the negative electrode comprises at least one metal salt comprising carbon which is soluble in the solvent, wherein the total content of the soluble metal salt comprising carbon and the electrically inert particles is 2 wt % or less based on the total weight of the active material in the negative electrode.

10. The nonaqueous secondary battery according to the claim 1, wherein the dried and pressed coating density is at least 1.75 g/cm³, and the logarithmic value of differential intrusion is at least 0.17 cm³/g at the pore diameter of the maximum.

11. The nonaqueous secondary battery according to the claim 1, wherein the specific surface area of the graphite is at least 0.5 m²/g.

12. The nonaqueous secondary battery according to the claim 1, wherein the graphite comprises a combination of primary particles having an average particle diameter of 5 μm or less and secondary particles having an average particle diameter of at least 10 μm.

13. An electronic device comprising the nonaqueous secondary cell of claim 1.

* * * * *